Figure 12:
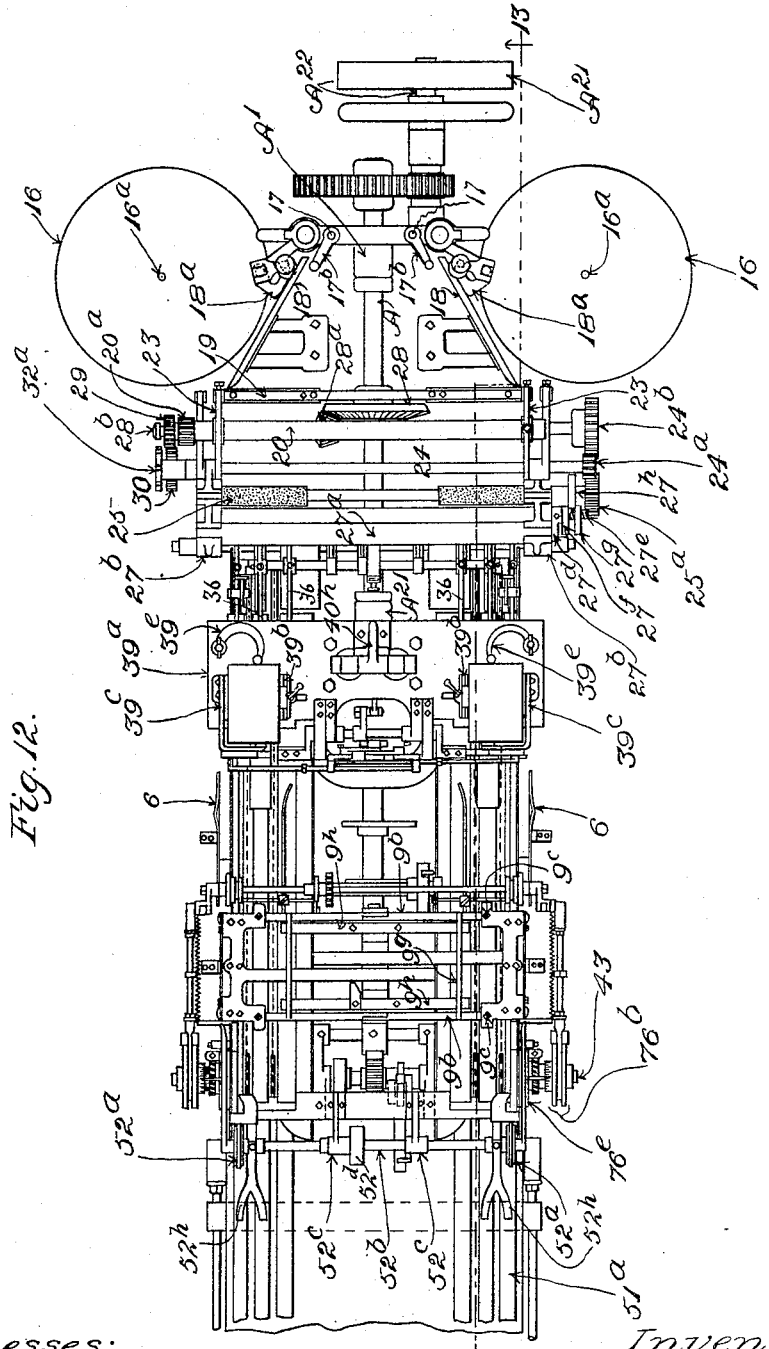

W. I. LEWIS.
MACHINE FOR APPLYING FLY LEAVES AND THE LIKE TO THE SIGNATURES OF BOOKS.
APPLICATION FILED JUNE 30, 1906.
1,127,034.
Patented Feb. 2, 1915.
12 SHEETS—SHEET 1.
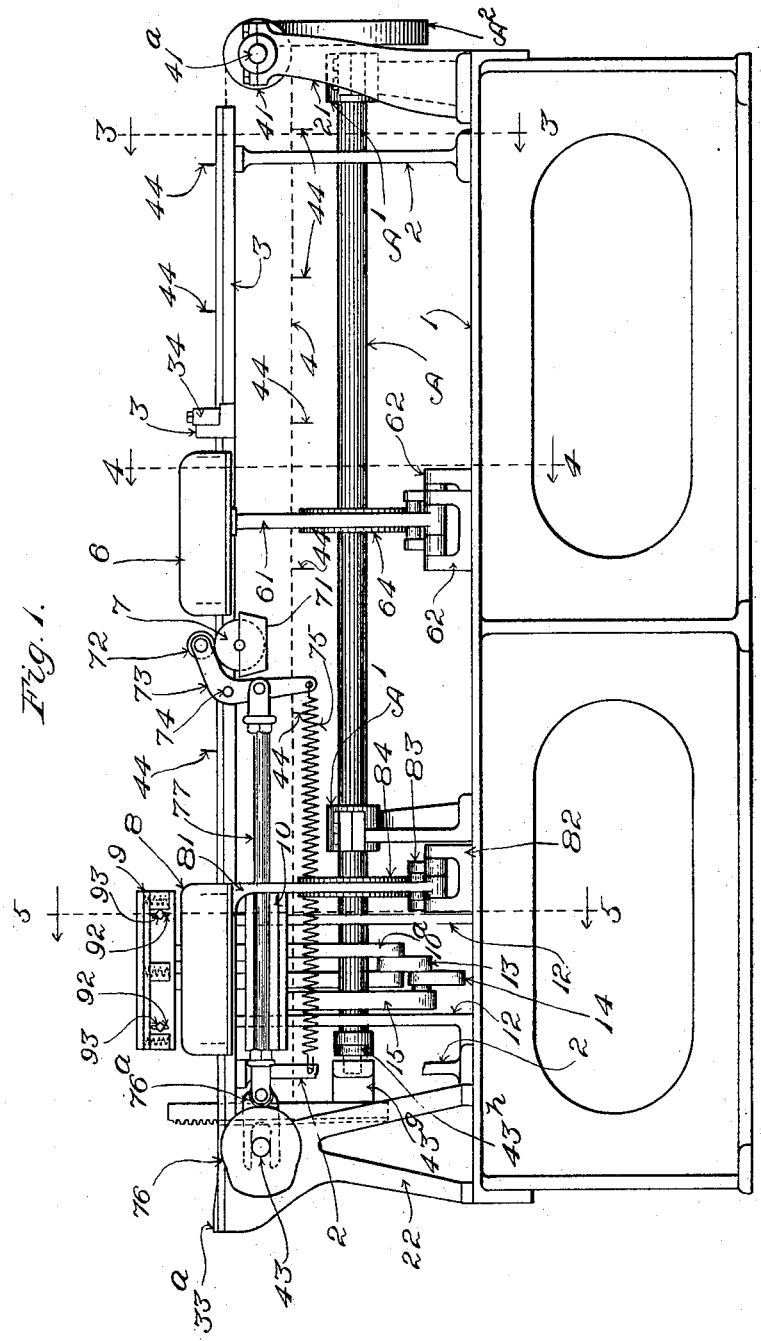
Witnesses:
Oscar F. Hill
Edith J. Anderson
Inventor.
Willard I. Lewis
by Chas. F. Randall
Attorney.

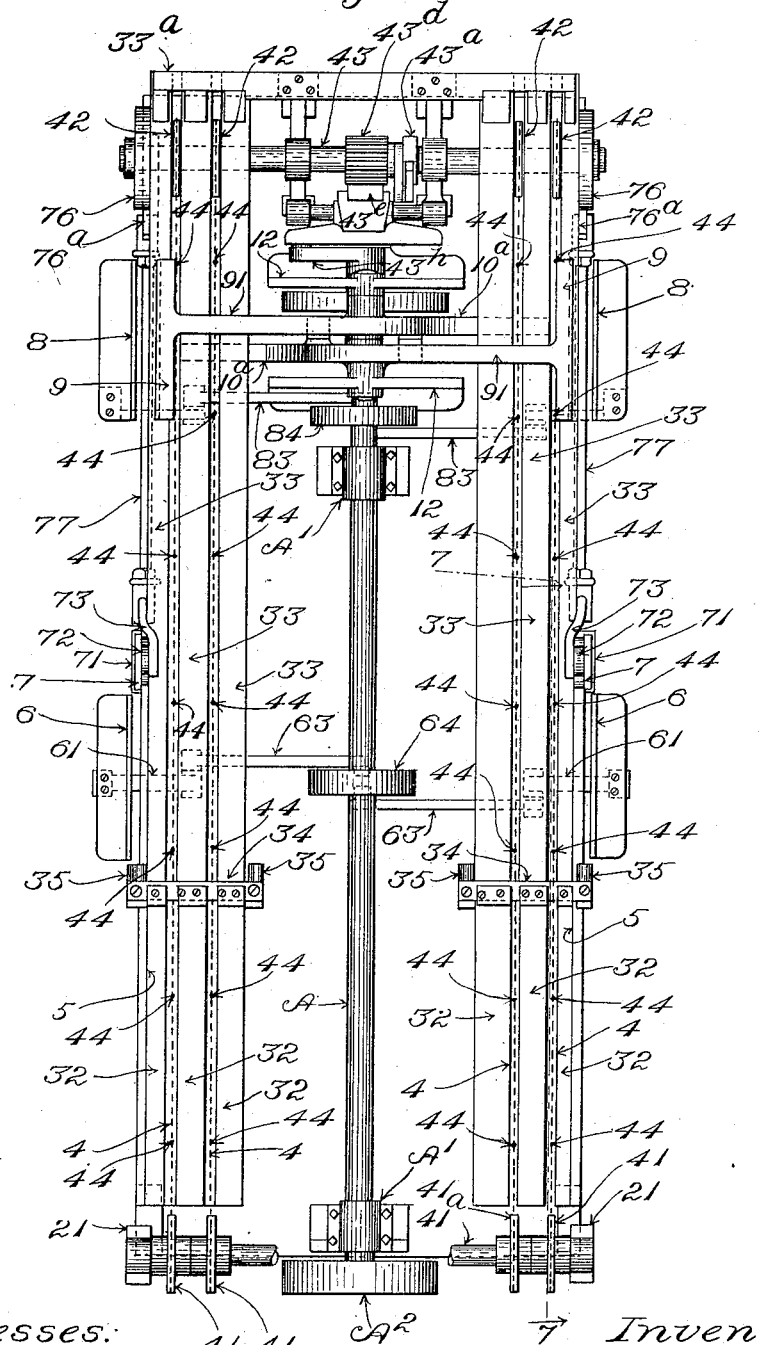

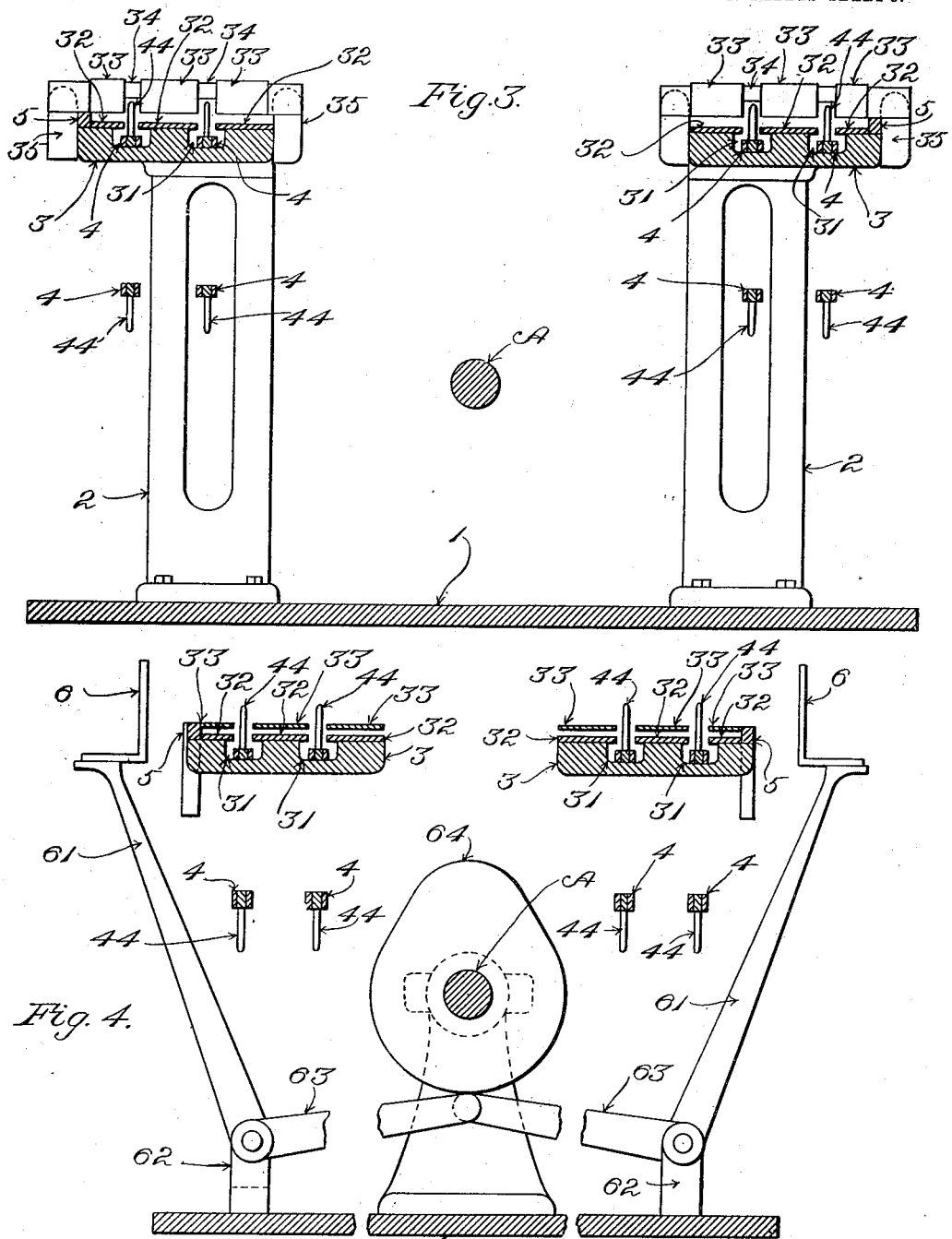

W. I. LEWIS.
MACHINE FOR APPLYING FLY LEAVES AND THE LIKE TO THE SIGNATURES OF BOOKS.
APPLICATION FILED JUNE 30, 1906.
1,127,034.
Patented Feb. 2, 1915.
12 SHEETS—SHEET 4.
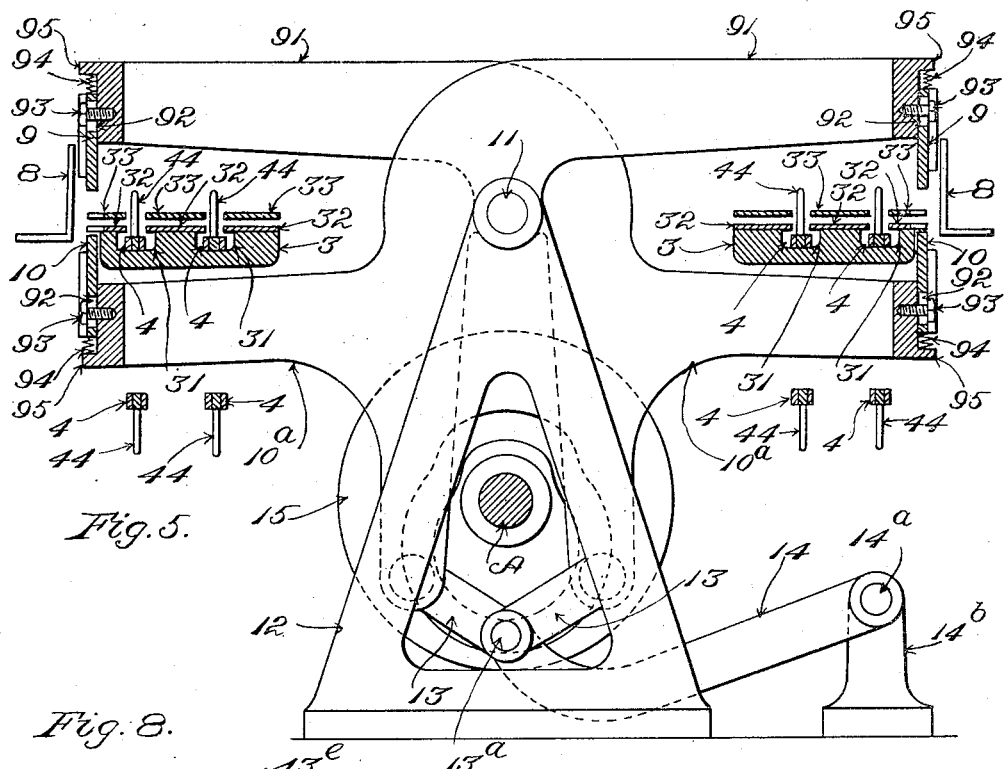
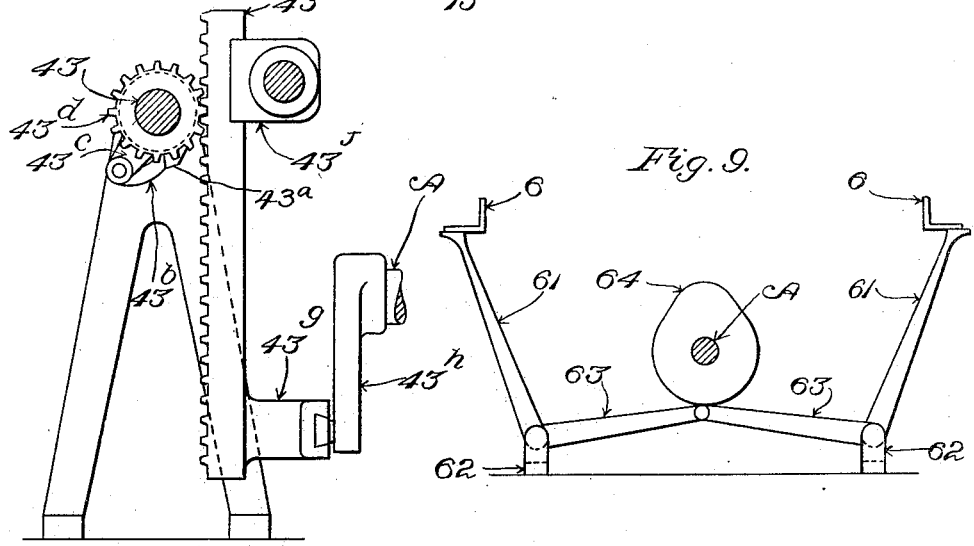
Witnesses:
Oscar F. Hill
Edith J. Anderson.
Inventor:
Willard I. Lewis
by Chas. F. Randall
Attorney.

W. I. LEWIS.
MACHINE FOR APPLYING FLY LEAVES AND THE LIKE TO THE SIGNATURES OF BOOKS.
APPLICATION FILED JUNE 30, 1906.
1,127,034.
Patented Feb. 2, 1915.
12 SHEETS—SHEET 5.
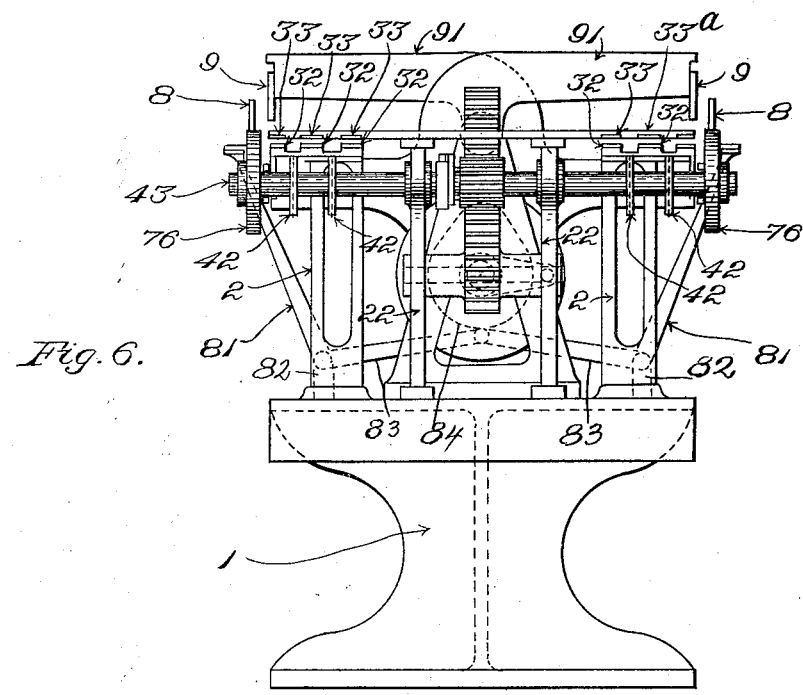
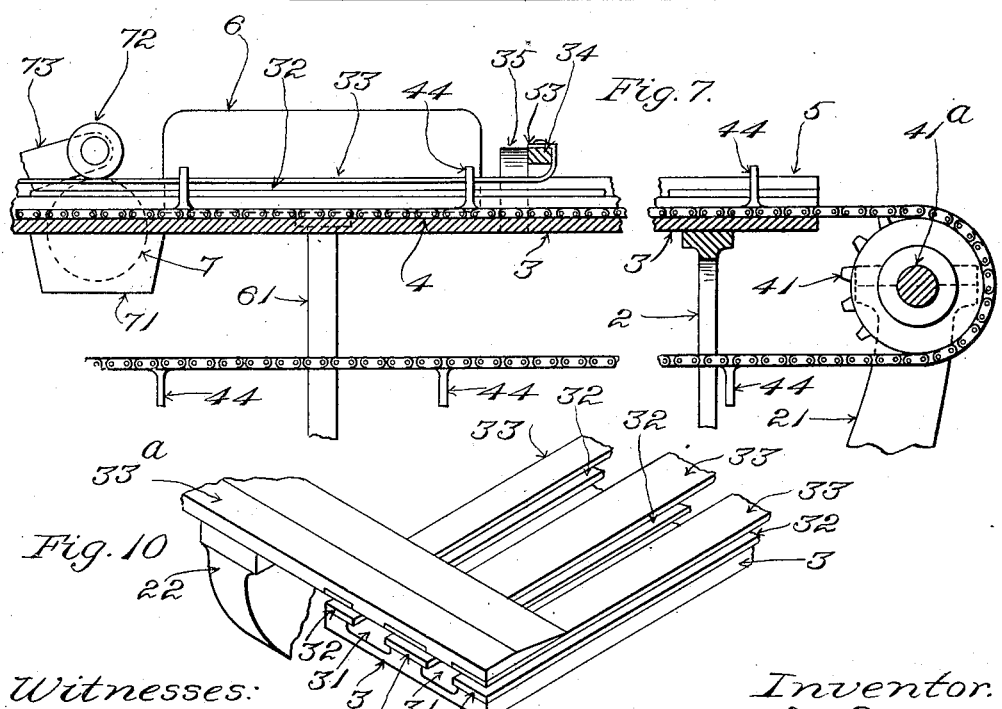
Witnesses:
Oscar F. Hill
Edith J. Anderson
Inventor.
Willard I. Lewis
by Chas. F. Randall
Attorney.

W. I. LEWIS.
MACHINE FOR APPLYING FLY LEAVES AND THE LIKE TO THE SIGNATURES OF BOOKS.
APPLICATION FILED JUNE 30, 1906.
1,127,034.
Patented Feb. 2, 1915.
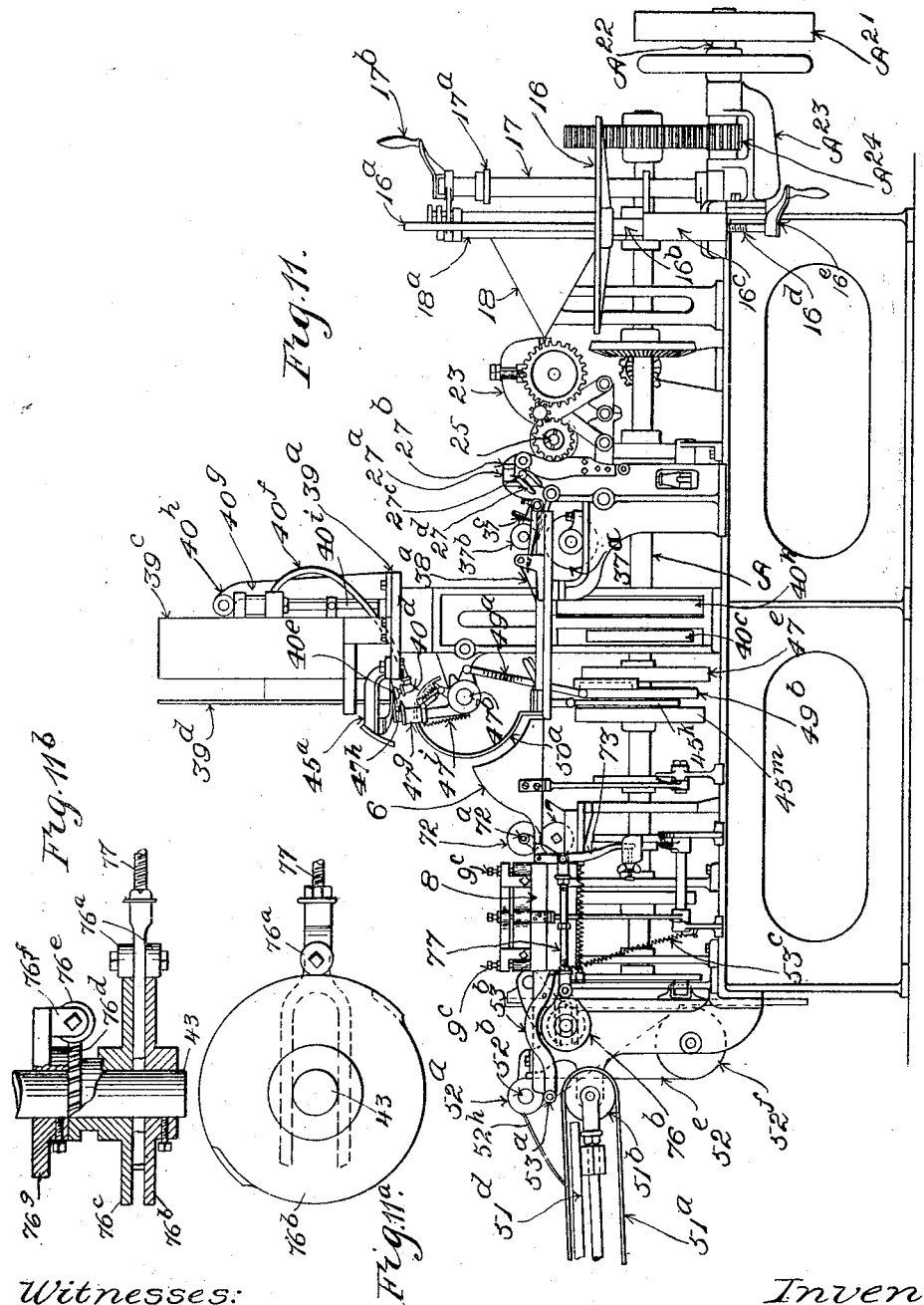

W. I. LEWIS.
MACHINE FOR APPLYING FLY LEAVES AND THE LIKE TO THE SIGNATURES OF BOOKS.
APPLICATION FILED JUNE 30, 1906.

1,127,034.

Patented Feb. 2, 1915.
12 SHEETS—SHEET 7.

Witnesses:
Oscar F. Hill
Edith J. Anderson.

Inventor:
Willard I. Lewis
By Chas. F. Randall
Attorney.

W. I. LEWIS.
MACHINE FOR APPLYING FLY LEAVES AND THE LIKE TO THE SIGNATURES OF BOOKS.
APPLICATION FILED JUNE 30, 1906.

1,127,034.

Patented Feb. 2, 1915.
12 SHEETS—SHEET 8.

Witnesses:
Oscar F. Hill
Edith J. Anderson.

Inventor:
Willard I. Lewis
by Chas. F. Randall
Attorney.

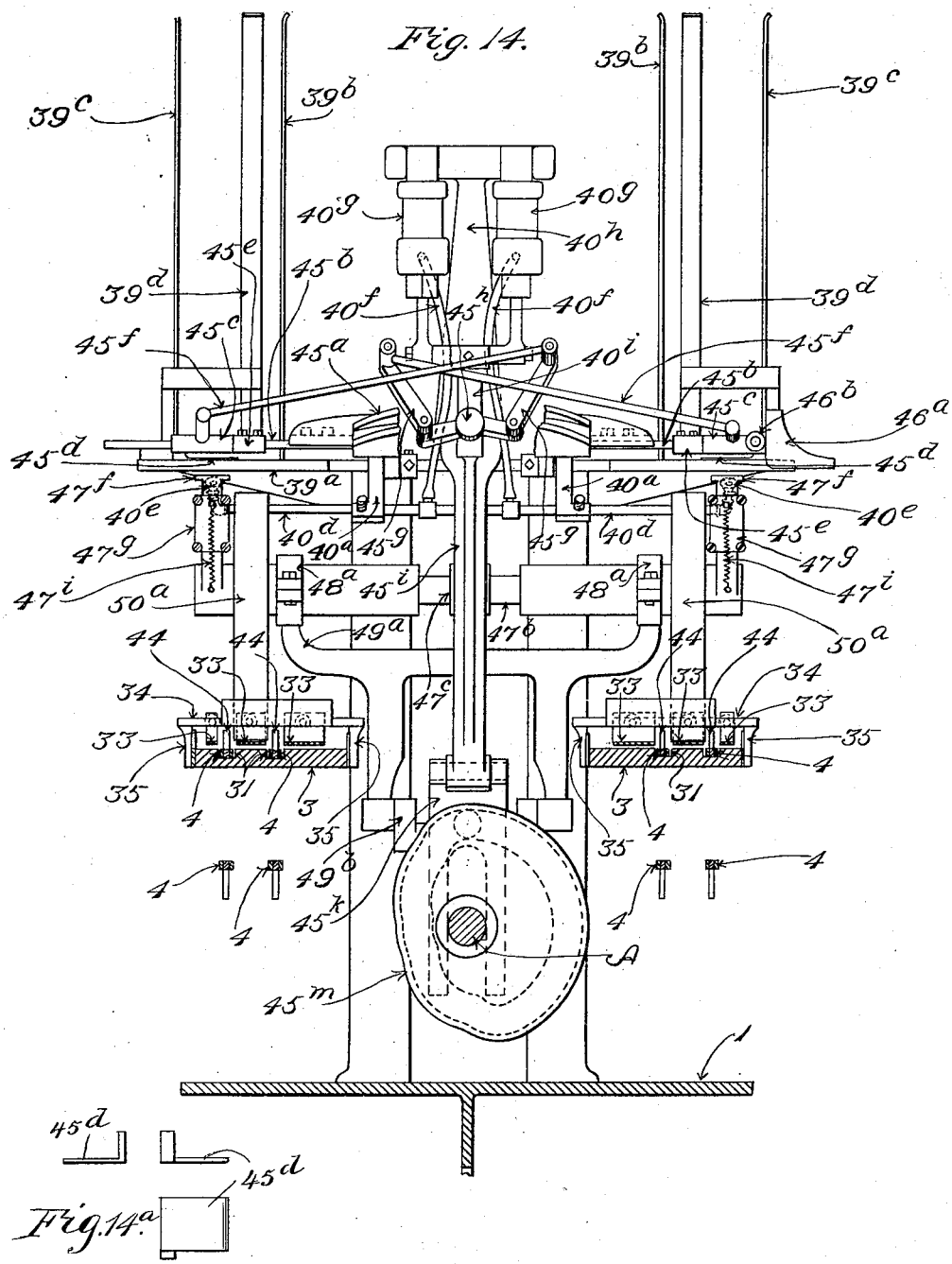

W. I. LEWIS.
MACHINE FOR APPLYING FLY LEAVES AND THE LIKE TO THE SIGNATURES OF BOOKS.
APPLICATION FILED JUNE 30, 1906.

1,127,034.

Patented Feb. 2, 1915.

12 SHEETS—SHEET 10.

Witnesses:
Oscar F. Hill
Thos. R. P. Gill

Inventor:
Willard I. Lewis
by Chas. F. Randall
Attorneys.

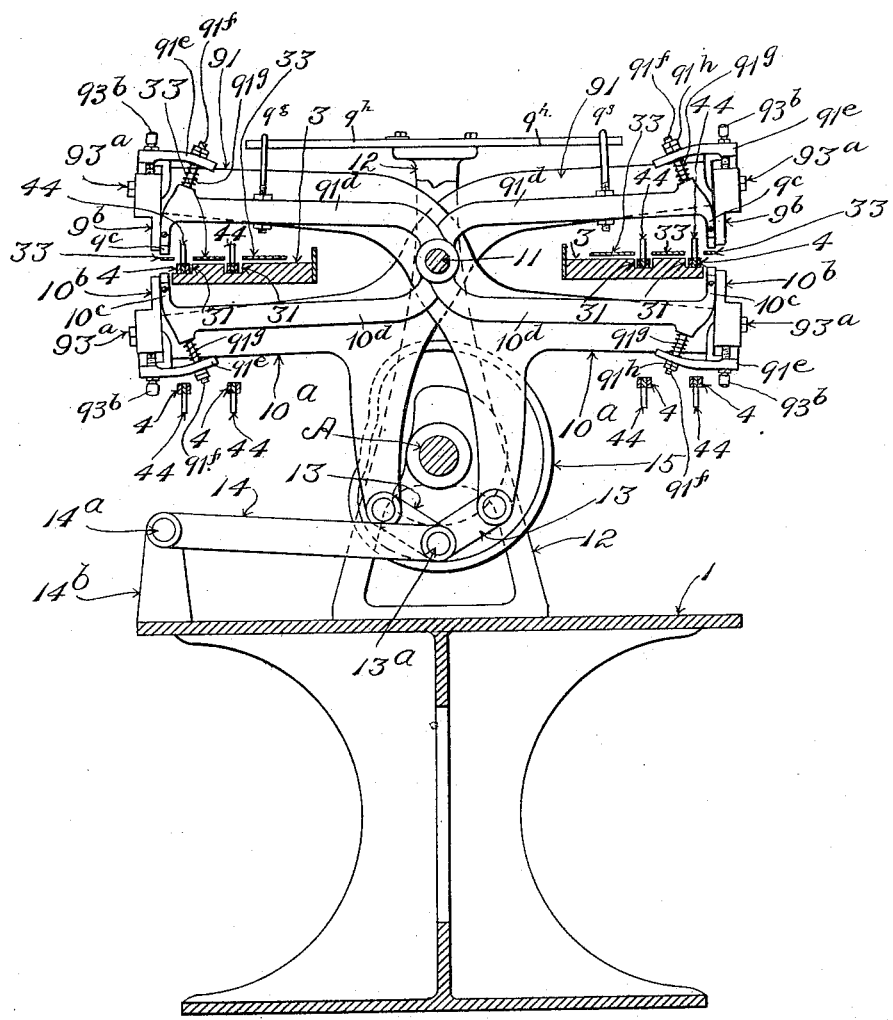

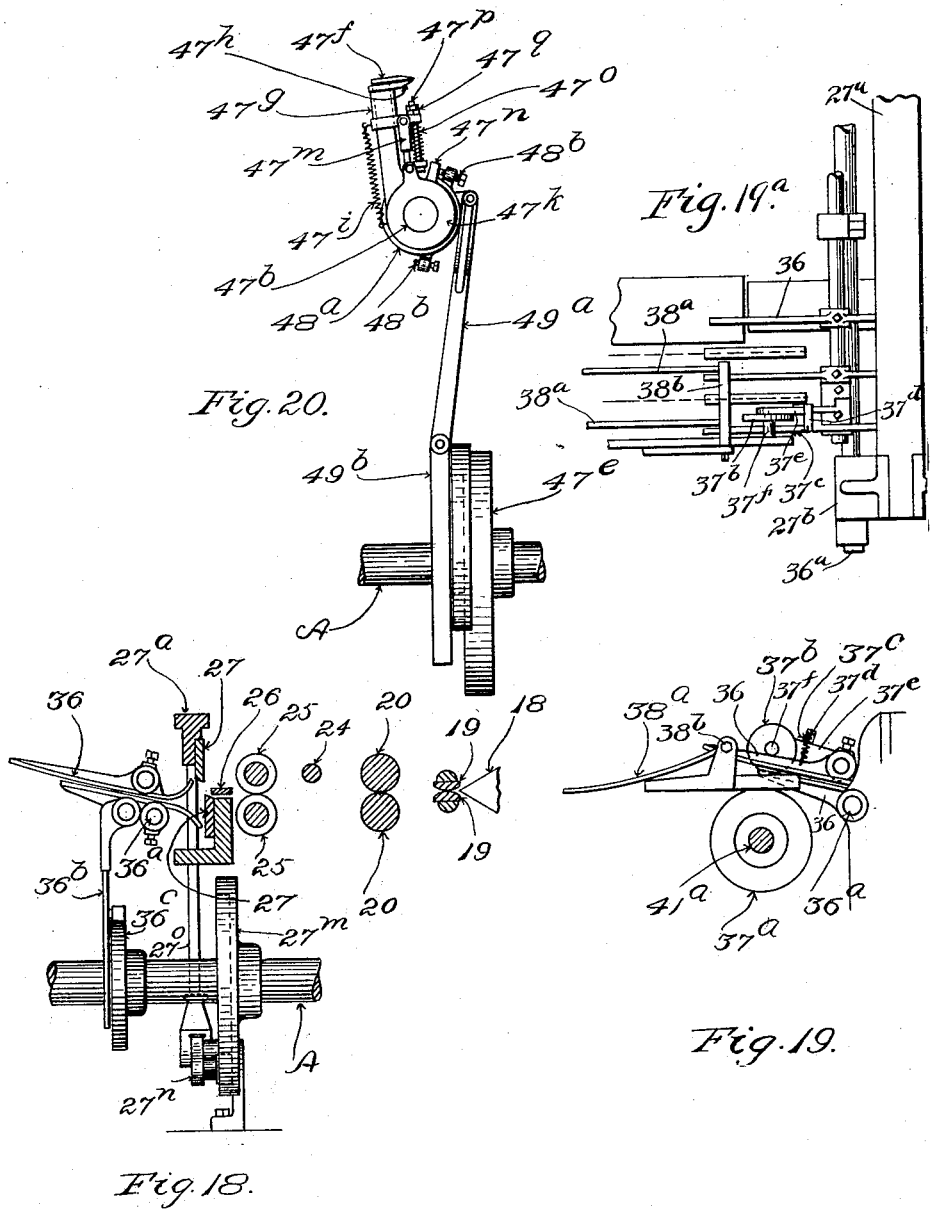

UNITED STATES PATENT OFFICE.

WILLARD I. LEWIS, OF WALPOLE, MASSACHUSETTS, ASSIGNOR TO WILLIAM F. MARRESFORD, OF BROOKLYN, NEW YORK.

MACHINE FOR APPLYING FLY-LEAVES AND THE LIKE TO THE SIGNATURES OF BOOKS.

1,127,034. Specification of Letters Patent. Patented Feb. 2, 1915.

Application filed June 30, 1906. Serial No. 324,236.

*To all whom it may concern:*

Be it known that I, WILLARD I. LEWIS, a citizen of the United States, residing at Walpole, in the county of Norfolk, State of Massachusetts, have invented a certain new and useful Improvement in Machines for Applying Fly-Leaves and the like to the Signatures of Books, of which the following is a specification, reference being had therein to the accompanying drawings.

In the art of book-binding, one of the operations preliminary to assembling and securing together the signatures, etc., constituting the body of a book, is to attach, with the aid of cementitious material such as glue or paste, certain additional sheets to certain of the said signatures. In some instances a single or unfolded sheet, constituting a fly-leaf, is united along one margin thereof to one face of an end-signature, adjacent the inner or folded edge of the said signature, such a fly-leaf being attached to each end-signature. Cuts and the like are united in like manner to the appropriate signatures. In other instances, a sheet which is folded upon itself at its middle is attached or united adjacent the fold thereof to the exterior of an end-signature. Such a folded sheet is variously termed a fly-sheet or an end-paper. In subsequently completing the binding operations, one-half of the said fly-sheet or end-paper is pasted to the inner surface of the adjacent side of the cover, to constitute a lining therefor, while the other half constitutes one of the fly-leaves of the book. In the case of the first signature of a book, the fly-leaf, or fly-sheet or end-paper, is applied to the front of such signature; in the case of the last signature of a book, the fly-leaf, or fly-sheet or end-paper, is applied to the back of the same. A cut or the like sometimes is attached to the front of a signature, and sometimes to the back of a signature.

My invention has for its general object to provide an automatic machine of novel character by means of which single fly-leaves, folded or doubled fly-sheets or end-papers, and cuts, as well as other like parts of books, all of which for convenience of designation will be comprehended generically under the term "fly-leaves" in the following description, may be attached to signatures of books or the like.

One object in particular of the invention is to provide an automatic machine by means of which fly-leaves or cuts may be attached to the backs or the fronts of signatures according as may be desired, the machine being serviceable, both for the attachment of fly-leaves and cuts to the fronts of those signatures with which such attachment is necessary, and for the attachment of fly-leaves and cuts to the backs of those with which the latter attachment is required.

A further object in particular is to provide a machine in which the work of attaching fly-leaves or cuts to the fronts of one set of signatures may be performed simultaneously with that of attaching fly-leaves or cuts to the backs of a second set of signatures.

A further object in particular is to provide a machine in which the fly-leaves or the like, either single or folded, are formed from a continuous strip or web of paper by doubling, when required, the said strip longitudinally upon itself, then cutting the same into lengths suitable for fly-leaves, and automatically feeding the said lengths and the signatures with which they are to be connected to the devices by which the respective fly-leaves and signatures are assembled and united.

I have herein illustrated my invention as embodied in two forms of machines which are constructed and organized to attain the first two particular objects just mentioned, although in some instances the broader features of the invention, as defined hereinafter, may be embodied in a machine in which the third of the said objects is not sought to be attained. The main principles of my invention may be carried into effect by various forms, constructions, and arrangements of the different devices.

Figure 13:
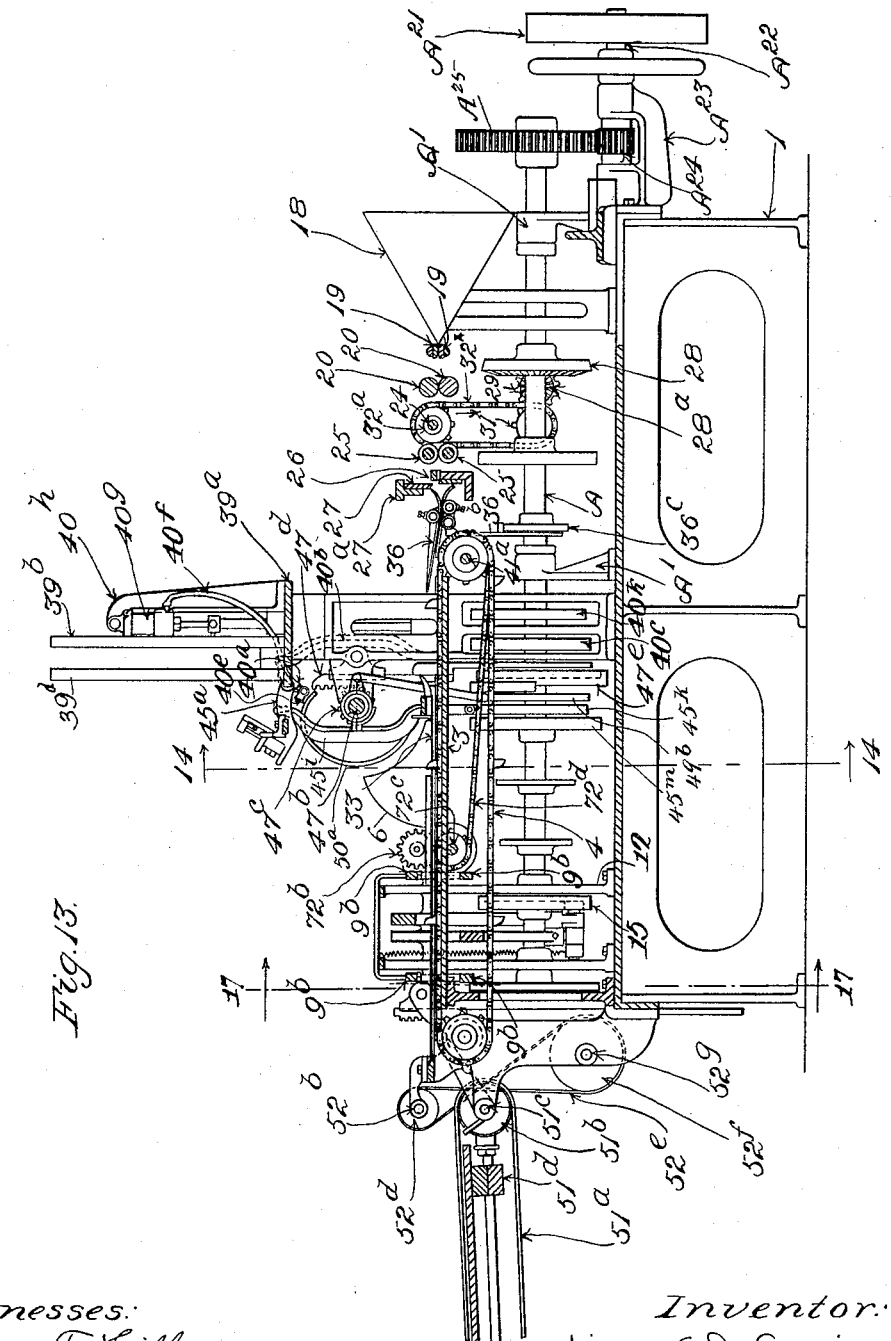
Figure 16:
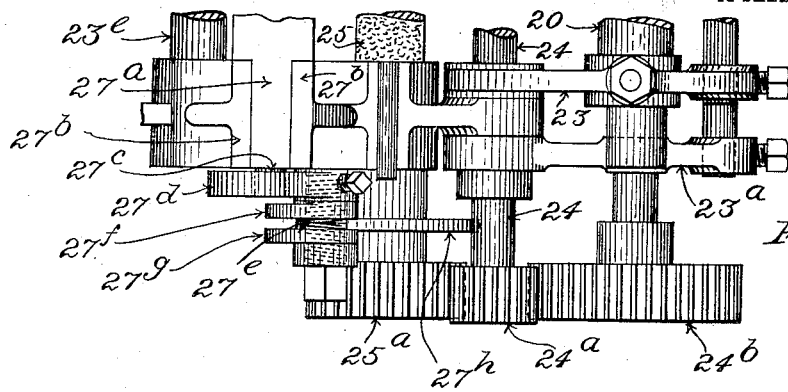
Figure 15:
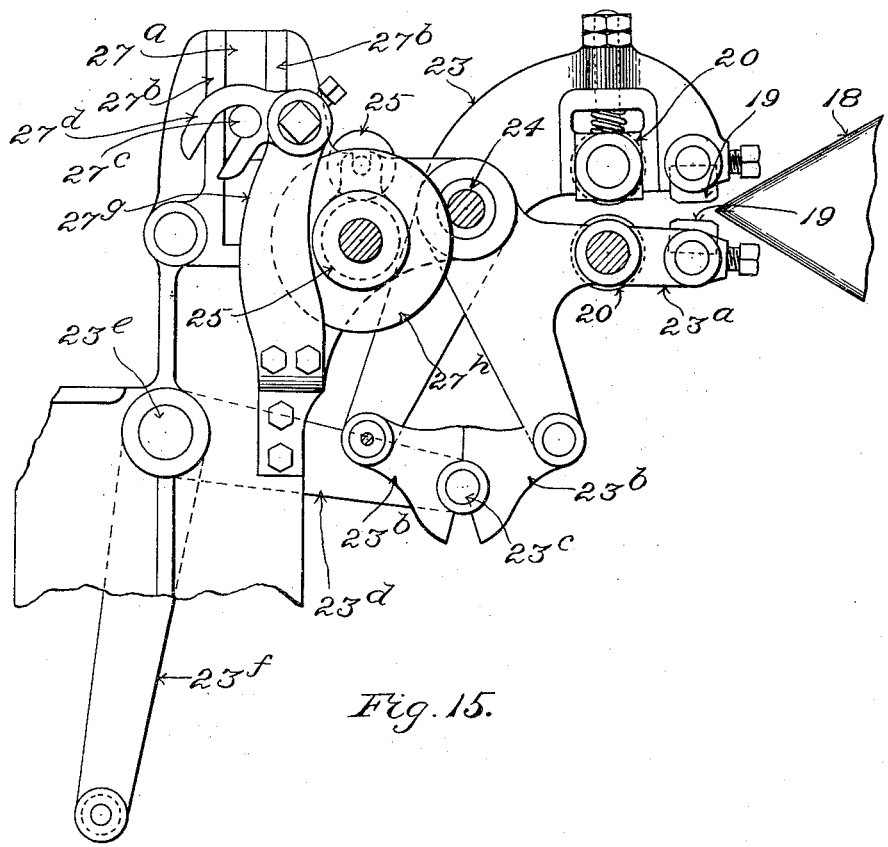

In the drawings,—Figure 1 shows in side elevation the first of the machines aforesaid. Fig. 2 shows the said machine in plan. Fig. 3 is a view of the machine in vertical section on the plane indicated by the dotted line 3, 3, in Fig. 1, looking in the direction that is indicated by the arrows adjacent the ends of the said line. Fig. 4 is a view in vertical section on the plane indicated by the dotted line 4, 4, in Fig. 1, looking in the direction indicated by the arrows adjacent the ends of the said line. Fig. 5 is a view in vertical section on the plane indicated by the dotted line 5, 5, Fig. 1, looking in the direction indicated by the arrows adjacent the ends of the said line. Fig. 6 is a view showing in elevation the left-hand end of the machine in Fig. 1. Fig. 7 is a view showing a portion of the machine in longitudinal section along the dotted line 7, 7, Fig. 2. Fig. 8 is a detail view, partly in vertical section, of the mechanism for actuating the chain-shaft at the delivery end of the machine. Fig. 9 is a view in transverse section on the order of a diagram illustrating one set of the back-edge gages or registering devices and the actuating mechanism therefor. Fig. 10 is an isometric view of certain details at the delivery end of the machine, showing chiefly the manner of supporting the extremities of the strips of the upper guideway at such end of the machine, and providing for the discharge of the united signature and fly-leaf therefrom. Fig. 11 shows in side elevation the second of the machines aforesaid. Fig. 11$^a$ shows in side elevation on an enlarged scale the adjustable cam of the second form of machine, and certain parts in connection therewith. Fig. 11$^b$ is a sectional view of the details of Fig. 11$^a$. Fig. 12 is a plan of the machine shown in Fig. 11. Fig. 13 is a view in vertical longitudinal section on line 13, 13, of Fig. 12. Fig. 14 is a view mainly in vertical section in the plane of the line 14, 14, of Fig. 13. Fig. 14$^a$ comprises detail views of one of the separators. Figs. 15 and 16 are detail views of the feed mechanism of the machine of Figs. 11, 12, etc., for the continuous strip which is used in making the fly-leaves or fly-sheets. Fig. 17 is a view in cross-section on line 17, 17, Fig. 13, of the machine of Figs. 11, 12, 13, etc., showing more particularly the presser-devices. Fig. 18 is a detail view, partly sectional, of certain of the devices at the right hand end of the form of machine shown in Figs. 11, 12, 13, etc. Fig. 19 is a detail view, mainly in side elevation, of the vertically-swinging guides or conductors of the said form of machine. Fig. 19$^a$ is a plan view of the parts shown in Fig. 19. Fig. 20 is a detail view of the swinging nippers of the said form of machine, and the devices for operating the said nippers.

Having reference to the drawings, the base of the framing is designated 1 in the case of each of the machines that are shown. From the said base rise stands or uprights supporting the various working and other parts to which reference will be made. The driving shaft in the case of each machine is shown at A, it being journaled in bearings with which the stands A', A', are furnished. In Figs. 1 and 2 a band-pulley A$^2$, to receive a suitable driving band (not shown), is fast upon shaft A.

Referring to the form of machine shown in Figs. 1 to 10, the stands or uprights which are designated 2, 2, in Figs. 1, 3 and 6, support horizontal tables 3, 3, extending parallel with each other lengthwise of the machine. The said tables are located at opposite sides of the machine. Each of the said tables 3 is formed at its upper side with longitudinally-extending parallel grooves 31, 31, as shown best in Figs. 3, 4 and 5. Upon the upper surface of each table are secured thin metal strips 32, 32, the proximate edges of which, as shown best in Figs. 3, 4 and 5, project partly across the grooves 31, 31, but are separated by spaces constituting narrow slots extending lengthwise of the table. The strips 32, 32, form in combination a supporting guide-way for the fly-leaves which are operated upon in the machine. The said fly-leaves are laid in succession upon the said strips at the receiving end of the machine, such end being at the right hand side in Fig. 1, and are fed in sequence along the same. Above the series of strips 32, 32, in connection with each table 3, is arranged a second series of strips 33, 33, in close proximity to the strips 32, 32. The said strips 33, 33, are shorter than the strips 32, 32, and respectively correspond in position vertically with the respective strips 32, 32. At the supply-end of the machine the strips 33, 33, corresponding with each table 3 pass beneath a transverse bar 34, Fig. 7, the latter having its ends fastened by screws to the top portions of blocks 35, 35, the latter rising from the said table 3 at the inner and outer sides, respectively, of the two series of strips 32 and 33. The strips 33, 33, are bent upward around the bar 34, and their ends are fastened by screws to the top side of the said bar, as shown best in Figs. 2 and 7. The strips 32, 32, at the respective sides of the machine are extended forward beyond the bars 34, 34, in order to afford opportunity to lay the fly-leaves upon the said strips 32, 32, in advance of the said bars 34, 34. The signatures which are to have the fly-leaves connected therewith are placed upon the strips 33, 33, adjacent the bar 34, and in the operation of the machine are moved along the same toward the delivering end of the machine, in unison with the fly-leaves below the same resting upon the strips 32, 32. For the purpose of feeding the fly-leaves and signatures automatically along the supporting guide-ways therefor, feed-chains 4, 4, are employed. At the opposite ends of the machine the said feed-chains pass around sprocket-wheels 41, 41, and 42, 42. At the supply-end of the machine the sprocket-wheels are mounted upon a supporting shaft 41$^a$ extending transversely across the machine and journaled in bearings upon stands or uprights 21, 21, Figs. 1 and 2. The sprocket-wheels 42, 42, at the delivering-end of the machine are fast upon a transverse shaft 43 which is journaled in bearings upon the upright stands 22, 22, Figs. 1 and 6. For the purpose of actuating the feed-chains, intermittent rotary movement is communicated to the shaft 43 in a manner which is explained later herein. The upper length of each feed-chain intermediate the corresponding sprocket-wheels 41, 42, works within the runway constituted by one of the grooves 31 of a table 3, the feed-chain resting and sliding upon the bottom of said groove. See Figs. 3, 4 and 5. For engagement with the fly-leaves and signatures, to cause them to travel in unison with the feed-chain, the links of the latter are furnished with pins 44, 44, projecting therefrom, and which in the travel of the chain through the grooves 31, 31, extend upward through the slots between the strips 32, 32, and 33, 33. The pins are of sufficient length or height to rise somewhat above the upper surfaces of the strips 33, 33.

In operation, a fly-leaf laid upon the strips 32, 32, of either table 3 at the supply-end of the machine, will be engaged in the advance of the feed-chains by the next succeeding pins 44, 44. By the movement of the feed-chains, the said fly-leaf will be carried along the slideway constituted by the strips 32, 32. As the feed-chains move along, a signature placed upon the strips 33, 33, in advance of the cross-bar 34, will be engaged by the said pins and thereafter such signature and the said fly-leaf will move along in company, the one thereof vertically above the other and the rear ends of both thereof registering with each other in consequence of the mutual engagement of such ends with the same pins 44, 44. As applied to the strips 32, 33, the fly-leaves and signatures are laid thereon with the head-ends thereof, that is to say, the ends thereof which are at the top in a book, turned toward the front end or supply-end of the machine. Hence, by the engagement of the pins 44 with the head-ends of the fly-leaf and signature, the said head-ends are caused to register with each other as the pins push the fly-leaf and signature along the respective supporting guide-ways.

In placing the fly-leaf upon the strips 32, 32, of either table, one edge of the fly-leaf is placed in contact with an edge guide 5 Figs. 2, 3 and 7 rising above the level of the upper surfaces of the strips 32, 32, and thereby the position of the fly-leaf laterally as it journeys forward through the machine is determined. In case of a folded fly-leaf or end-paper the folded edge thereof is placed in contact with the edge-guide 5. When the signature is laid upon the strips 33 constituting the way therefor, it is applied thereto with its folded edge projecting slightly beyond the line of the edge-guide 5, in order that the marginal portion of the signature adjacent the line of the fold may extend beyond the corresponding edge of the fly-leaf, in position to be acted upon at the under surface thereof by the paster as the signature and corresponding fly-leaf move forward together. For the purpose of correctly positioning the signature laterally in connection with each table, so as to insure a proper extent of projection beyond the edge of the fly-leaf, I provide the back-edge gage 6. Preferably, each of the said back-edge gages is movable in a direction at right angles to the length of the slide-ways for the signature and fly-leaf, and is provided with means for reciprocating the same in such direction, that is to say, transversely with relation to the slide-ways, in order that by its inward movement it may by contact with the folded back-edge of the signature push the latter transversely across the slide-way 33, 33, into exactly the proper position. In this instance, the edge-gage 6 at each side of the machine is attached to and supported by an arm 61, see more particularly Figs. 4 and 9, of a rocker which is pivotally mounted in a stand 62 upon the base 1, the said rocker having an arm 63 extended toward the middle of the machine, where it is in operative engagement with a cam 64 on the main or driving shaft A. Through the action of the cam 64 the back-edge gages 6, 6, at the opposite sides of the machine are moved to engage with the signatures and shift or jog the same transversely upon their slide-ways. The return movements of the back-edge gages 6, 6, are produced by the action of suitable springs, not shown.

After the signature has been positioned in readiness for the application of glue or paste to the margin thereof adjacent its back-edge, the movement of the feed-chains causes the projecting marginal portion of the signature to make contact with the glue-applying or pasting-device and travel past the latter. In the present instance, the pasting device at each side of the machine consists of a roll 7 partly immersed in a paste-trough 71, the paste-roll 7 having in conjunction therewith a presser-roll 72 by the action of which the under surface of the projecting marginal portion of the signature is held firmly in contact with the paste-covered surface of the roll 7 as the signature travels past the latter.

In order that the presser-roll 72 may not become covered with paste through contact with the surface of the roll 7 at the times when no signature separates the two rolls from each other, the presser-roll is mounted with capacity for movement toward and from the paste-roll and has combined therewith means for separating the same from the paste-roll as a signature passes from between them, and allowing it to move toward the paste-roll again as the leading end of the next signature arrives in position to make contact with the paste-roll. In this instance, the presser-roll 72 in connection with each paster is mounted upon a movable carrier which is constituted by a bell-crank 73, the latter being pivoted at 74 to one edge of the table 3. The said carrier 73 is acted upon by the tension of a contracting spiral spring 75 having one extremity thereof connected with the upright 2 adjacent the delivery end of the machine, the said spring operating with a tendency to move the carrier 73 in the direction to carry the presser-roll 72 toward the paste-roll 7. For the purpose of operating the carrier to separate the presser-roll from the paste-roll, a cam 76 is provided upon the shaft 43, the said cam acting against a roll 76ª which is pivotally mounted upon a yoke forming part of a rod 77 that is jointed at one end thereof to the carrier 73. The yoke is slotted, and fits and slides upon the shaft 43, as shown in Fig. 1. The spring 75 acts to hold the roll 76ª in contact with the periphery of the cam.

After the signature has had glue or paste applied to the projecting marginal portion thereof by means of the glue or paste-applying device, and has passed beyond the latter, the said marginal portion of the signature is caused to register with the corresponding marginal portion of the fly-leaf in order to place the signature and fly-leaf in readiness for being united to each other. To this end the folded back-edge of the signature is engaged by a back-edge registering device which operates to shift or jog the signature transversely to the extent necessary to cause the signature and fly-leaf to register as aforesaid. A device for the purpose is shown at 8 in connection with each table 3. The devices 8, 8, are mounted to reciprocate transversely with relation to the slide-ways, and to this end each thereof is attached to the upper end of an arm 81 of a rocker that is mounted pivotally upon a stand 82 supported by the base 1, the said rocker having in connection therewith a second arm 83 in operative engagement with a cam 84 upon the main shaft A. The cam acts to move the back-edge registering devices 8, 8, inward to engage the signatures, the outward movement of the said devices being produced by the action of a spring or springs, not shown.

After the back-edges of a signature and the corresponding fly-leaf have been brought into register with each other through the action of the back-edge registering device 8, the signature and fly-leaf are pressed together to insure the union thereof. For this purpose I employ at each side of the machine a pair of compressing-jaws 9 and 10. The said jaws are carried, respectively, by arms 9¹, 10ª, of rockers which are mounted pivotally upon a short shaft 11, Fig. 5, which is supported by stands 12, 12, rising from the base 1. The arm 9¹ at one side of the machine and the arm 10ª at the opposite side of the machine constitute parts of the same rocker. For the purpose of communicating movement to the rockers so as to move them simultaneously but in opposite directions with relation to each other, the said rockers are furnished with downward extensions which are both connected by means of links 13, 13, Figs. 1 and 5, to the pivot 13ª on the inner arm or end of a radius-arm 14, Fig. 5, the latter being pivoted at 14ª upon a stand 14ᵇ rising from the base 1, and the said pivot working in the groove of a cam disk 15 upon the shaft A. In order to render the action of the jaws 9 and 10 of the pressers yielding, each of the same is formed as a separate piece having slots therethrough, as at 92, 92, through which are passed the stems of screws 93, 93, the heads of the said screws serving to hold the said jaws to the outer extremities of the respective arms of the rockers. The slots permit movement of the jaws upon the said arms in the direction of the said slots. The jaws are backed up by compression-springs 94, 94, Fig. 5, which are partly contained in pockets with which the jaws are formed, the said springs acting by their outer ends against flanges 95, 95, projecting from the arms of the rockers. The springs serve to hold the jaws up to their work, but should an unusual thickness of material intervene between the acting faces of a pair of jaws, the springs will yield to avoid breakage or injury.

After the separation of the jaws 9, 10, from each other, the movement of the feed-chains takes the united signature and fly-leaf from between the jaws, and discharges them from the rear ends of the strips 33, 33. To permit of this discharge, the said ends of the strips 33, 33, are connected with the cross-bar 33ª, Figs. 1, 2, 6 and 10. The said cross-bar is attached at intermediate points in its length to the upper ends of the stands 22, 22, its ends being free so that the connected signature and fly-leaf at either side of the machine may pass above and below the same. See more particularly Fig. 10.

The step-by-step movement of the feed-chains is produced by imparting intermittent rotary movement to the shaft 43. This is effected by means of an intermittent clutch-device and operating connections between the same and the main shaft A. See Fig. 8. The said intermittent clutch-device comprises in the present instance a single-toothed wheel 43ª Figs. 2, 6 and 8 that is fast upon the shaft 43, and a pawl 43ᵇ that is adapted to engage with the tooth of the said wheel and is mounted pivotally upon an arm 43ᶜ which is sleeved upon the shaft 43. The operating connections between the intermittent clutch-device and the shaft A comprise a spur-gear 43$^d$ which is fast with the arm 43$^c$, and a rack 43$^e$ which is held in engagement with the spur-gear 43$^d$ by means of a guide 43$^f$, the said rack having a crosshead 43$^g$ in which works a block which is connected with a crank 43$^h$ upon the shaft A.

Usually, in practice, the back-edge registering devices are given a sufficient extent of movement inward to cause them to engage with the back-edge of the fly-leaf as well as that of the signature, so that after such edge of the signature has been engaged and the latter moved transversely upon the upper strips or guideway, the fly-leaf shall be engaged also by the back-edge registering device and moved thereby a short distance in unison with the signature. Thereby I guard against the possibility of defective joining of a signature and fly-leaf inward from the outer edge of the lower strips or guideway.

The two sets of pasting devices and back-edge registering devices are reversely-related with respect to the head-end registering devices which are constituted by the feed-chains and the projections thereof which engage with the head-ends of the fly-leaf and signature. In the present instance, the pasting and back-edge registering devices at one side of the machine are located at the left-hand side of the said feeding-chains, while those at the other side of the machine are located at the right-hand side of the feeding-chains. The consequence of this is that when a signature is laid upon the upper guideway with its back-edge in position at one side of the machine to enable the adjoining marginal portion of the down-turned face of the signature to be acted upon by the pasting devices at such side, the paste will be applied and the fly-leaf will be attached to one face of the signature, while when a signature is laid with its back-edge in position at the other side of the machine to enable the adjoining marginal portion of the face of the signature which is there turned down, the paste will be applied and the fly-leaf will be attached to the other face of the signature. Thus, in the drawings the devices at the left hand side of the machine will act to attach the fly-leaf to the front of the signature, while those at the right-hand side thereof will act to attach the fly-leaf to the back of the signature.

The machine comprises, essentially, right and left mechanisms which are adapted to attach fly-leaves and the like in reverse relations to signatures. The said machine consists, in effect, of duplicate attaching or combining devices, and oppositely-disposed gaging or back-edge registering devices whereby to permit the fly-leaves to be attached in the said reverse relations to the signatures. It has been devised with more especial reference to providing a twin machine for enabling one series of signatures to have fly-leaves attached to the front thereof, and at the same time a second series to have fly-leaves attached to the backs thereof, but it will be obvious that if it is not desired to operate upon two series of signatures simultaneously then either set of the pasting and back-edge registering devices alone may be utilized, according as it is desired to apply fly-leaves to the fronts of signatures or to the backs thereof. While I have shown two tables, with corresponding sets of guideways for the fly-leaves and signatures, it will be obvious that the extent of the separation of the same is not material, and also that it is not essential to the invention in all its phases that separate tables and guideways should be employed.

In the machine shown in Figs. 11, 12, 13, etc., a continuous strip or web of paper is severed into lengths, suitable for fly-leaves or end-papers, which are delivered successively to the guideway for fly-leaves or end-papers in position to be engaged by the feed-chains. Signatures contained in a hopper are fed automatically from the latter to the guideway for signatures, in position corresponding with that of the fly-leaf or end-paper which is to be united thereto. The machine is adapted to be employed in attaching single-sheet fly-leaves, cuts, or the like, but for the purpose of attaching doubled fly-sheets or end-papers I provide the same with a device for doubling the web of paper upon itself longitudinally. The registering, paste-applying, and pressing devices resemble those of the machine which already has been described. After passing the pressing devices the connected signature and fly-leaf or end-paper are pushed off the rear ends of the guideways upon a delivery belt.

In the machine shown in Figs. 11, 12, 13, etc., a band-pulley A$^{21}$ is fixed on a driving-shaft A$^{22}$, which is mounted in bearings in a stand A$^{23}$ attached to base 1, the said driving-shaft being furnished with a spur-pinion A$^{24}$ meshing with a spur-gear A$^{25}$ that is fast on shaft A.

16, 16, are turn-tables located at the opposite sides of the machine, at the front or feeding end of the latter, and designed for the support of the rolls of paper from which the fly-leaves or end-papers are to be formed. Each turn-table is furnished with an upwardly-extending spindle, 16$^a$, to enter the central opening of the roll of paper which is applied to such turn-table, and is furnished, also, with a downwardly-extending shaft, 16$^b$, fitting within a supporting socket, 16$^c$, on the machine-frame, within which socket the shaft is adapted to turn. For the purpose of effecting vertical adjustment of the turn-table and the roll of paper mounted thereon, an adjusting screw, 16ᵈ, is applied to the lower end of the socket, the said screw being provided with a handle, 16ᵉ, for convenience in turning the same in effecting adjustment. Adjacent each turn-table an upright guide-bar 17, Fig. 11 is located, around which the paper leaving the roll supported by such turn-table changes its direction.

17ᵃ is a guide for the upper edge of the paper, such guide being fitted upon the upright guide-bar 17 and adjusted up and down by means of an adjusting screw which is furnished with an operating handle 17ᵇ, Figs. 11 and 12.

At 18, 18, are triangular doubling-folders, one at each side of the machine, by means of which each of the webs or strips of paper is doubled upon itself longitudinally as it travels from the supply-roll toward the body of the machine.

18ᵃ, Figs. 11 and 12 is a cloth-covered presser-bar in conjunction with each doubling-folder, the corresponding web or strip of paper passing between the said presser-bar and the flat surface of the folder and being held by the presser-bar close to the said surface.

At 19, 19, Figs. 12, 13, and 15 are two press-bars extending longitudinally across the machine, one above the other, and at 20, 20, are a pair of feed-rolls adjacent said horizontal press-bars. From the apex of the triangular folder, the doubled web or strip of paper passes between the two press-bars, and then between the two feed-rolls. The upper press-bar and upper feed-roll are supported by arms 23, 23, shown best in Figs. 15 and 16, mounted loosely upon a transversely extending shaft 24 which is provided in bearings on the opposite side-frames of the machine. The lower press-bar and lower feed-roll are supported by arms 23ᵃ, 23ᵃ, that also are mounted loosely upon the said shaft 24. At each side of the machine, a downwardly-extending portion of the arm 23 is connected with a similar portion of the arm 23ᵃ by toggle-links 23ᵇ, 23ᵇ, the meeting ends of which are pivoted to a cross-rod 23ᶜ carried by the arms 23ᵈ, 23ᵈ, of a rocker, the latter having its rock-shaft 23ᵉ journaled in the opposite side-frames of the machine and provided with a third arm, 23ᶠ, serving as a handle by means of which the frames may be moved manually to separate the feed-rolls and press-bars to permit of the threading-in of the web or strip of paper, and afterward may be moved toward each other to cause the feed-rolls and press-bars to approach and compress the web between them.

The purpose in using the press-bars is to obviate the difficulty which is experienced in practice in causing the peak or point of the folder to enter properly into the nip of a pair of cylindrical rolls. From between the feed-rolls 20, 20, the web or strip of paper passes over the shaft 24 on which the arms 23, 23ᵃ, are hung, and between a second pair of feed-rolls, 25, 25. These last are covered with frictional surfacing material which is indicated in Figs. 16 and 18. The shafts of feed-rolls 25, 25, are journaled in bearings with which the opposite side-frames of the machine are provided. At the delivery side of these feed-rolls, a fixed shear-blade 26, Figs. 13 and 18 is located. The web or strip passes between the said fixed shear-blade and a movable shear-blade 27 carried by a cross-bar 27ᵃ, Figs. 11, 12, 15, 16 and 18 which is movable vertically in guides 27ᵇ, 27ᵇ, on the opposite side-frames of the machine. The said cross-bar is connected operatively with the main shaft, A, of the machine through the instrumentality of devices by means of which the cross-bar and shear-blade carried thereby are raised and lowered at the proper times in the working of the machine. In the present instance, the said devices consist of a cam 27ᵐ, Fig. 18, mounted on shaft A, levers 27ⁿ in engagement with the said cam, one of such levers being shown in Fig. 18, and a link 27ᵒ connecting the outer arm of said lever with one end of the cross-bar. The lower feed-roll 20 is driven by gear-connections from the shaft A, the said shaft having for the purpose a large bevel gear 28 thereon, Figs. 12 and 13 meshing with a small bevel gear 28ᵃ on the inner end of a short cross-shaft 28ᵇ, Fig. 12, carrying at its outer end a change spur-gear 29 meshing with a spur-gear 30 fast with a sprocket-wheel 31ˣ, around which and a sprocket wheel 32ᵃ on one end of the shaft 24 passes a sprocket chain 32ˣ. Shaft 24 is provided at its opposite end with a spur pinion 24ᵃ, see more particularly Figs. 12 and 16 meshing with a spur gear 24ᵇ fast upon the lower feed-roll 20. Thereby the said lower feed-roll is driven. The upper feed-roll 20 is driven from the lower one by spur-pinions 20ᵃ, Fig. 12. The feed-rolls 25, 25, are driven by means of spur pinion 24ᵃ, which latter engages a spur-gear 25ᵃ, Figs. 12 and 16 that is mounted upon the shaft of the lower roll 25 with capacity to turn thereon, the said gear being connected with the said shaft by an adjustable frictional coupling arrangement, of well-known character, by means of which the shaft is caused normally to turn in unison with the gear. For the purpose of arresting the rotation of the second pair of feed-rolls as the shear-blades close together, a pin 27ᶜ, Figs. 11, 15 and 16 is provided upon one end of the cross-bar 27ᵃ carrying the movable blade 27, this pin working in a slot in an arm 27ᵈ which is attached to a right-and-left screw 27ᵉ that is fitted to correspondingly-threaded holes in arms 27$^f$ 27$^g$ located at opposite sides of the collar 27$^h$ fixed on the shaft of the lower feed-roll 25. One of the said arms is bolted to the machine-framing and the other thereof is supported by the first. When, now, the arm 27$^d$ is swung by the rising and falling movements of the crossbar 27$^a$ so as to turn the right-and-left screw first in one direction and then in the other, the arms 27$^f$, 27$^g$, are moved toward and from each other so as alternately to clamp the collar between them, and thereby hold the lower feed-roll 25 from turning, and to release the said feed-roll so as to permit it to turn. While the arms are holding the collar 27$^h$ so as to prevent the lower feed-roll 25 from turning, the friction-coupling aforesaid slips relative to the spur-gear 25$^a$. For the purpose of varying the feed for different lengths of fly-leaves or end-papers, the gears 29, 30 are replaced by others having different numbers of teeth. The general arrangement comprising the tables 3, the lower way for the fly-leaves or end-papers, the upper way for the signatures, the feed-chains, the means for actuating the feed-chains, the jog or registering devices 6 and 8, in the case of the machine shown in Figs. 11, 12, 13, etc., resembles in the main that of the machine first described. The lower sets of strips 32, 32, are omitted, however, although they may be employed if desired.

Intermediate the shear-blades or cutters 26, 27, and the receiving ends of the feed-chains, are located two sets of guides or conducting devices 36, see more particularly Figs. 13 and 18, into which the folded webs or strips of paper are advanced by the action of the second pair of feed-rolls. These guides or conductors comprise upper and lower bars arranged in pairs and mounted fixedly on a rocker 36$^a$, Fig. 18, which is journaled on the machine framing as indicated in Fig. 19. A depending bar 36$^b$ Figs. 13 and 18 is jointed to the rocker and is furnished with a roll which rests upon the periphery of a cam 36$^c$ on shaft A. The said cam acts to raise the rocker and its guides or conductors, and the parts descend again under the action of gravity. By means of the cam the rocker and its guides are raised during the advance of the paper that is occasioned by the intermittent rotation of the second pair of feed-rolls 25, 25, so as to enable the leading end of the paper to pass above and clear the projections of the feed-chains. The timing of the feed-chains is such that during a part of the advance of the paper, certain of the projections thereon are in the path of the leading end of the paper, the feed-chains being in motion for a part of the time, and standing still for a part of the time. Hence, in order that the paper may not be obstructed in such part of its advance the guides or conducting devices are raised so as to elevate the leading end of the paper above the said projections. Upon the carrying shaft 41$^a$ for the sprocket-wheels at the receiving ends of the feed-chains are mounted feeding-disks 37$^a$ Figs. 11 and 19, having frictional peripheries, and upon the rocker are loosely hung arms 37$^e$ carrying presser-disks or rolls 37$^b$, the said arms being drawn down by springs 37$^c$ to cause the said presser-disks to coact with the feeding-disks aforesaid by compressing the paper against the latter. One end of a spring 37$^c$ (see Figs. 19 and 19$^a$) is connected with a small bracket 37$^d$ on the arm 37$^e$ carrying one of the said presser-disks, the other end thereof being connected with an adjacent upper guide 36. The hubs 37$^f$ of the presser-disks, or the studs upon which the said disks are mounted, project above certain of the guides of the rocker as shown in Figs. 19 and 19$^a$ so that in the lifting movement of the rocker the said guides lift the presser-disks and thereby separate them from the feeding-disks the parts are shown thus separated in Fig. 19. When the rocker is permitted to descend, however, the presser-disks are lowered so as to press the paper against the feeding-disks. Thereby the paper is gripped between the presser and feeding-disks and the feed-rolls so that in consequence the fly-leaf or end-paper, which by this time has been severed from the continuous web or strip by the closing of the shears or cutters, is fed forward by means of the presser and feeding-disks, it being thereby caused to travel upon the leading end of the guideway for fly-leaves or end-papers at the same rate of speed as the feed-chains are being advanced at the time, and in advance of a set of the projections of the feed-chains. In this manner the severed fly-leaf or end-paper is fed from the shears or cutters to the leading end of the said guideway and is delivered to and presented upon the latter in position to be engaged by the said set of projections preparatory to being carried forward thereby through the machine. The upper bars of the guides or conductors 36 are extended somewhat in the direction of the length of the guideway, as shown best in Figs. 13, 19 and 19$^a$ to hold the paper down upon the guideway, and, in addition, for the purpose of applying a sort of drag to the upper surface of the paper, flexible strips 38$^a$, Figs. 11, 19 and 19$^a$ are attached to a short bar 38$^b$ extending crosswise above the guideway, the said strips hanging down upon the guideway so as to rest upon the paper as it passes along the latter.

The signatures are placed upon an upper shelf 39$^a$ extending crosswise of the machine and supported by stands rising from the main bed or table of the machine. From the said table rise inner and outer side-pieces 39$^b$, 39$^c$, and a front piece 39$^d$ as well as swinging rear pieces 39$^e$, 39$^e$. See more particularly Fig. 12. The hopper construction has the customary adjustments to enable the same to be accommodated to the size of signatures to be operated upon.

A rocking frame 40$^a$ Fig. 13 mounted upon the upper shelf 39$^a$ and having its axis in line with the upper front corner of the said shelf has connected therewith a bar 40$^b$ provided with a roll engaged by a grooved cam 40$^c$ on the shaft A, the said rocker having arms in which is mounted a pipe 40$^d$ Figs. 11 and 14 having at the opposite extremities thereof the suction-pickers 40$^e$. The said pipe 40$^d$ is connected by means of flexible tubing 40$^f$ with pump cylinders 40$^g$ that are hung upon a central post 40$^h$, the pump-pistons being connected with a cross-head that is attached to the upper end of the rod 40$^i$ carrying a roll working in a groove of a cam 40$^k$ on the line shaft. A second rocker 45$^a$, Fig. 13, also having its axis in line with the front upper corner of the upper bed 39$^a$, has laterally-extending guide-arms 45$^b$, 45$^b$, Fig. 14 on which are mounted blocks 45$^c$, 45$^c$, carrying the separators 45$^d$, 45$^d$ which last are shown best in Figs. 14 and 14$^a$. Fig. 14$^a$ shows opposite elevations and a plan view of one of the separators. The said separators are similar in type and mode of operation to those of U. S. Letters Patent to Stuart H. Pray, No. 767,081, Aug. 9, 1904. The said blocks 45$^c$, 45$^c$, are capable of sliding upon the said guide-arms in the direction of the length of the latter and transversely with reference to the machine. The movement of the said blocks toward the middle of the machine is limited by means of stops 45$^e$ 45$^e$ which are bolted to the said guide-bars. By means of connecting-rods 45$^f$ 45$^f$ the blocks 45$^c$, 45$^c$, are joined operatively with the upwardly-extending arms of bell-cranks 45$^g$, 45$^g$, that are mounted pivotally upon the intermediate portion of the said second rocker 45$^a$.

The horizontal arm of one of the bell-cranks carries a pin 45$^h$ working in the slot that is formed in the corresponding arm of the other bell-crank, and this pin is joined to the upper end of a bar 45$^i$ which at its lower end is pivotally connected with a yoke 45$^k$ provided with a roll working in a groove of a cam 45$^m$ on the shaft A. Upon the upper shelf 39$^a$ are fixed blocks 46$^a$, 46$^a$, with which engage anti-friction rolls 46$^b$, 46$^b$, that are mounted upon the slide-blocks 45$^c$, 45$^c$, carrying the separators. These fixed blocks have vertical inner faces and horizontal lower faces. In the depressed position of the second rocker the separator-carrying blocks being at the outer ends of the guide portions of the said rockers, the anti-friction rolls on the said blocks take against the horizontal under surfaces of the fixed blocks. The grooved cam 45$^m$, acting to raise the yoke and connecting bar, transmits force to the horizontal arms of the bell-cranks. This force tends to raise the second rocker, but the tendency is resisted by the engagement of anti-friction rolls with the horizontal faces of the fixed blocks. Consequently, the rocker cannot rise and the force simply acts to move the separator-carrying blocks inward along the guide portions until the said rolls clear the said horizontal faces of the fixed blocks, at which time the separator-carrying blocks will have become engaged with the fixed stops on the guide-bars. The inward movement of the separator-carrying blocks having been arrested by reason of the engagement of the said blocks with the said fixed stops on the guide-bars, the bell-cranks are prevented from turning further with relation to the second rocker, and the continued transmission of upwardly-acting force through the yoke and connecting bar aforesaid acts now to raise the second rocker and the separators which are applied thereto. By the inward movement of the separator-blocks and separators the latter are passed between the signatures which have previously been depressed by the pickers and the remainders of the stacks or piles of signatures. By the upward movement of the second rocker and the separators the signatures above the bottom ones are lifted clear of the latter and preferably so as to partly release the latter.

For the purpose of transferring the bottom signature from the stack or pile to the upper surface of the guideway for signatures, a pair of nippers is provided at each side of the machine. The two pairs of nippers are mounted upon the opposite ends of a rock-shaft 47$^b$ Figs. 11 and 13 that is journaled in bearings with which the upright central stands of the machine-frame are provided, the said rock-shaft being furnished with a spur-segment 47$^c$ Fig 13 that is fast thereon and is engaged by a rack upon the upper end of a bar 47$^d$ that is provided with a roll working in the groove of a cam 47$^e$ upon the shaft A. Upon each end of the rock-shaft 47$^b$ is made fast an arm having an outer nipper-blade 47$^f$ attached to its outer end as shown best in Fig. 20. The said arm serves as a guide for a block 47$^g$ carrying the inner nipper-blade 47$^h$, the said block having connected with the same the outer extremity of a contracting spiral spring 47$^i$, the other extremity of which is connected with the hub or sleeve of the arm, the said spring acting with a tendency to move the block toward the axis of the shaft. Upon the rock-shaft 47ᵇ adjoining the sleeve or hub of the arm is mounted movably a ring 47ᵏ which is connected by a link 47ᵐ with the inner end of the slide-block, the ring and link together constituting a toggle. The link is in two pieces, one pivoted to the slide-block and formed with a sleeve, and the other pivoted to the ring and provided with a pin working in the said sleeve. The two parts are respectively provided with lugs between which is located an expanding spiral spring 47ᵒ which is threaded upon a pin 47ᵖ passing through the said lugs, the said pin having a head below the lower lug and receiving upon its screw-threaded upper end above the upper lug at 47ᑫ an adjusting-nut and check-nut. The spring is compressed between the two lugs and acts with a tendency to extend the link, but the spring yields to accommodate variations in the thickness of the signature which is received between the two jaws and secures a yielding clamping action. For the purpose of automatically opening and closing the jaws the ring 47ᵏ is provided with a lug 74ⁿ projecting therefrom, and alongside the said ring is a second ring, 48ᵃ, also loosely sleeved upon the rock-shaft and provided with lugs having screw-tappets 48ᵇ, 48ᵇ, applied thereto for engagement with the lug 47ⁿ of the toggle-ring. The tappet-rings 48ᵃ, 48ᵃ, at the two sides of the machine are connected with the curved upper end of a connecting frame 49ᵃ which, at its lower end is pivotally joined to a yoke 49ᵇ provided with a roll working in a groove in the back of the same cam, 47ᵉ which operates the rack-bar. Through the connections described the tappet-ring is moved at the proper time to place its screw-tappets in position to engage with the lug of the toggle ring.

In operation, as the jaws descend in closed condition, carrying with them a signature, the lug of the toggle-ring encounters one of the screw-tappets, which latter arrests the said lug, thereby holding the toggle-ring while the nipper-carrying arm continues its movement. This operates with a tendency to break the toggle-joint, whereupon the spring connected with the slide-block operates to complete the opening movement of the nippers. As the nipper carrying arm swings upward the jaws rise in an opened condition and pass above and below the portion of the bottom signature which has been depressed by the picker. The tappet-ring now is moved in the reverse direction, causing the other screw-tappet to encounter the lug of the toggle-ring and thereby the toggle-ring is turned so as to strain the toggle, thus closing the nipper-jaws upon the signature, the toggle becoming locked so as to retain the nipper-jaws in their closed condition. For the support of the rear end of the signature while the front end is being carried around by the nipper-jaws in their descent, a curved strip of metal 50ᵃ is supported upon the cross-bar with which the leading ends of the steel tapes or bands 33, 33 of the signature guideway are connected. As the nipper-jaws arrive at the lower end of their stroke the leading end of the signature strikes against the lower end of the said strip of metal 50ᵃ just above the signature guideway, and is held thereby as the nippers in completing their swinging movement pass away therefrom.

The signature deposited upon the signature guide-way by the devices which have just been described, with its back edge projecting at the outer side of the said guideway, is acted upon by a positioning device 6, the positioning devices 6, 6, at the opposite sides of the machine, and the means for actuating the said positioning devices, being essentially as in the case of the first form of machine. A set of projections on the feed-chains 4, 4, already engaged with and acting to move a fly-leaf along the guide-way for fly-leaves, engages with the head-end of the said signature and act to advance the signature and fly-leaf, with their heads in proper register, to and past pasting devices comprising rolls 7, 7². The said pasting devices are essentially the same as the pasting devices of the first machine, excepting that the cam which controls the press-roll 7², and acts to cause the latter to be moved toward the paste-roll 7 while the signature is between the two rolls and to be moved away from the said paste-roll after the signature has passed, is made adjustable so as to enable the movements of the press-roll to be varied to suit the length of the signature. A convenient construction securing such adjustability is shown in the drawings, reference being had to Figs. 11ᵃ and 11ᵇ more particularly. In this construction two cam-disks 76ᵇ and 76ᶜ are employed, they being mounted side by side upon the shaft 43 and connected therewith so as to rotate in unison. Disk 76ᵇ is made fast to the said shaft by means of a clamping screw, as shown, and disk 76ᶜ is combined with the shaft in manner enabling it to be shifted angularly relative to the shaft and the disk 76ᵇ. Each disk has a segmental cam-portion. The yoke-shaped portion of the rod 77 which connects with the carrier 73 for the press-roll 7² passes between the two disks and carries two rolls 76ᵃ, 76ᵃ, at its opposite sides which are engaged by the peripheries of the two disks. It will be seen that so long as the raised portion of either disk engages with the corresponding roll 76ᵃ the press-roll 7² will be held raised. By setting the disk 76ᶜ so that its raised portion shall either overlap more or less that of disk 76ᵇ, or exactly coincide in position therewith, the point in the rotation of the shaft 43 at which the press-roll shall be raised, and accordingly the length of time during which the press-roll shall be upheld, may be varied at will. The necessary adjustment of the cam-disk 76$^c$ is provided for by mounting it upon the shaft 43 with capacity to turn thereon, and providing its hub with a worm-gear 76$^d$ engaged with a worm 76$^e$ mounted in bearings carried by a collar 76$^g$ fixed to the shaft 43. By rotating the worm 76$^e$ by hand, as by means of a key applied to its squared end, (see Fig. 11$^b$,) the disk 76$^c$ may be shifted angularly to the required extent relative to the disk 76$^b$.

The lower paste-rolls 7 are fixed upon a transverse shaft 72$^c$, Fig. 13, mounted in suitable bearings on the machine-frame and driven by a sprocket-chain 72$^d$ from shaft 41$^a$. Shaft 72$^a$ (Fig. 11) of the upper rolls 72 is connected by spur-gearing 72$^b$ with the shaft 72$^c$.

The back-edge registering devices 8, 8, and the means for actuating the same to bring the back-edges of a signature and the corresponding fly-leaf into register with each other after the back-edge of the signature has had paste applied to the same, and the actuating means for the said back-edge registering devices, are essentially the same as in the first form of machine. At 9$^b$, 10$^b$, see more particularly Fig. 17, are the compressing jaws by which the signature and fly-leaf are pressed together to insure the union thereof. The means for actuating such jaws is essentially the same as in the first form of machine. The said jaws, however, in this instance, are secured fixedly by means of clamping screws 93$^a$, 93$^a$ to the arms 91, 10$^a$, of the supporting and actuating rockers, they being adjusted upon the said arms toward and from each other to regulate their closing action by means of adjusting screws 93$^b$, 93$^b$. In connection with the jaws 9$^b$, 10$^b$, I employ secondary jaws or pressers 9$^c$, 10$^c$. The secondary jaws or pressers at each side of the machine are closely adjacent the jaws or pressers 9$^b$, 10$^b$, at such side, at the inner side of the latter jaws or pressers. The secondary jaws or pressers are mounted upon arms 91$^d$ and 10$^d$ of secondary rockers which are mounted pivotally upon the shaft 11 between the two pairs of rockers carrying and supporting the main jaws or pressers. The secondary jaws or pressers are arranged to be operated in proper timing with relation to the main jaws or pressers, by means of pieces 91$^e$, 91$^e$ projecting inwardly from the upper and lower arms of the main rockers, such pieces having holes through which pass pins 91$^f$, 91$^f$, projecting from the secondary rockers. Expanding spiral springs 91$^g$, 91$^g$ surrounding the said pins 91$^f$, 91$^f$, between the pieces 91$^e$, 91$^e$, and the secondary rockers act expansively to press the secondary jaws or pressers toward each other, the extent of the movement of the secondary jaws or pressers under the action of the said springs being limited by means of adjustable nuts 91$^h$, 91$^h$, on the screw-threaded outer ends of the said pins 91$^f$, 91$^f$, which nuts make contact with the outer surfaces of the said pieces 91$^e$, 91$^e$. By the action of the said springs the secondary jaws or pressers are caused to project inward beyond the main jaws or pressers when the pressing devices are open as in Fig. 17. When the pressing devices close, the secondary jaws or pressers close upon the fly-leaf and signature earlier than the main jaws or pressers, and in the subsequent opening of the presser-devices the said secondary jaws or pressers open later than the main jaws or pressers, thereby keeping hold of the work until the latter has been released by the opening of the main jaws or pressers, and serving to detach the work from the said main jaws or pressers in case it should tend to cling thereto.

To assist in opening the secondary jaws or pressers, flat spring strips 9$^h$, 9$^h$, Figs. 12 and 17, are fixed upon the top of stand 12. They extend transversely of the machine, under stirrups 9$^g$, 9$^g$, attached to the upper arms 91$^d$, 91$^d$, of the secondary rockers. These springs are bent somewhat by the descent of the said arms, and in reacting tend to raise the latter and the secondary jaws.

After the opening of the presser-devices, the movement of the feed-chain carries the united signature and fly-leaf to the end of the guide-ways and off therefrom, causing the leading ends of the signature and fly-leaf to pass beneath a feeding disk 52$^a$ on a transverse shaft 52$^b$, and between the said feeding disk and a coöperating presser-roll 53$^a$, Fig. 11. The said presser-roll is mounted upon a carrying lever 53$^b$, that is pivoted upon the machine-frame, and has connected therewith a contracting spiral spring 53$^c$ tending to hold the presser-roll 53$^a$ pressed against the feeding-disk 52$^a$ or the signature and fly-leaf between them. The transverse shaft 52$^b$ is driven by suitable operating connections, which are represented in the present instance by a pulley 52$^d$, Figs. 12 and 13, mounted upon an intermediate portion of the length of the said shaft, and a driving band 52$^e$ passing around the said pulley 52$^d$ and a second pulley 52$^f$ upon a suitably rotated shaft in the lower part of the machine. In passing from between the feeding disk and the presser-roll 53$^a$, the connected signature and fly-leaf discharge upon the top run of a slowly moving series of conveyer-belts 51$^a$ passing around guide-pulleys 51$^b$, carried by a supporting-frame 51$^d$. Presser-arms 52$^h$ loosely hung upon the transverse shaft 52$^b$ serve to deflect the connected signatures and fly-leaves downward upon the conveyer-belts 51ª after leaving the feeding-disks 52ª and presser-rolls 53ª.

For convenience in designation, I employ the term "back-edge" herein in connection with that edge of the fly-leaf, and that edge of a signature, which are bound in the back of a book, by way of distinguishing such edge from the top-end and bottom-end, and from the remaining edge which is exposed in a bound book. I employ the term "oppositely-acting" with reference to the two sets of back-edge registering devices which are used in a machine embodying my invention, by way of indicating the fact that the action of the registering devices at one side of the machine takes effect in the direction opposite to that of the set of devices at the other side of the machine.

I claim as my invention:—

1. A machine for attaching fly-leaves and the like to signatures of books and the like, comprising, essentially, end-registering devices, and duplicate sets of back-margin pasting means adapted to act upon the faces of signatures, back-edge registering, and pressing means, one set reversely disposed with relation to the other with the pasting means of each set constructed to render the back margin of one of the parts which are to be joined together by such set adhesive, and the back-edge registering means of each set constructed to act oppositely with relation to that of the other set, whereby one set is operative to attach fly-leaves to one face of signatures fed face to face therewith, and the other set is operative to effect attachment to the other face.

2. A machine for attaching fly-leaves and the like to signatures and the like, having in combination, duplicate back-margin pasters, adapted to act upon the faces of signatures, back-edge registering devices acting in one direction in conjunction with one back-edge paster, and in the opposite direction in conjunction with the other paster, and pressing devices to cause fly-leaves and signatures fed face to face with each other to unite, whereby fly-leaves may be attached to either face of signatures, as desired.

3. In a machine for attaching fly-leaves and the like to signatures of books and the like, in combination, opposite sets of pasters for pasting the back-edges of a fly-leaf and signature along the line of intended union, oppositely-acting back-edge registering devices, and pressure-devices, all coöperating to enable fly-leaves to be attached to either face of signatures, as desired.

4. A machine for attaching fly-leaves and the like to signatures of books and the like, comprising, essentially the combination with end-registering devices, of opposite sets of pasters for pasting the back-edges of a fly-leaf and signature along the line of intended union, oppositely-acting back-edge registering devices, and pressing-devices, reversely-related to the said end-registering devices and coöperating with the latter to enable fly-leaves to be attached to either face of signatures, as desired.

5. A machine for attaching fly-leaves and the like to signatures of books and the like, comprising, essentially, opposite sets of pasters for pasting the back-edges of a fly-leaf and signature along the line of intended union, oppositely-acting back-edge registering devices, duplicate end-registering devices oppositely-related to the respective sets aforesaid, and mechanism to press the fly-leaves and signatures together to cause them to unite.

6. A machine for attaching fly-leaves and the like to signatures and the like, having in combination, right and left pasting-devices, end-registering devices, back-edge registering devices acting in opposite directions against oppositely-placed sets of fly-leaves and signatures, and devices to press the fly-leaves and signatures together face to face to cause them to unite.

7. A machine for attaching fly-leaves and the like to signatures and the like, having in combination, end-registering devices for two sets of fly-leaves and signatures, also constituting feeding means therefor, right and left pasting devices, back-edge registering devices acting oppositely, right and left, upon the two sets of fly-leaves and signatures, and devices to press the fly-leaves and signatures together to cause them to unite.

8. A machine for attaching fly-leaves and the like to signatures of books and the like, comprising, essentially, feeding devices each having projections to engage the ends of a fly-leaf and a signature to feed said fly-leaf and signature and also cause the said ends to register with each other, duplicate sets of pasters and back-edge registering devices oppositely-related with respect to the said feeding devices, and devices each to press a fly-leaf and signature together to cause them to unite.

9. A machine for attaching fly-leaves and the like to signatures and the like, having in combination, means to sever a fly-leaf from a continuous web or strip of paper, means to assemble the said fly-leaf and a signature face to face, devices for causing the fly-leaf and signature to register at their back-edges and one end, and means for causing the fly-leaf and signature to become united by adhesive material along one exposed margin of each.

10. A machine for attaching fly-leaves and the like to signatures and the like, having in combination, means to sever a fly-leaf from a continuous web or strip of paper, means to separately feed the said fly-leaf and a signature and assemble the two face to face preparatory to being united, and devices for causing the fly-leaf and signature to register at their back-edges and one end, and means for causing the fly-leaf and signature to become united by adhesive material along their exposed back margins.

11. In combination, means to double a web or strip of material upon itself longitudinally, means to sever a fly-leaf or end sheet therefrom, means to assemble the said fly-leaf or end-sheet and a signature face to face, and means to unite corresponding marginal portions of the said elements together by adhesive material along one edge of each.

12. In a machine for attaching fly-leaves and the like to signatures of books, and the like, in combination, a support for a fly-leaf, an adjacent support for a signature, means acting against corresponding edges of the fly-leaf and signature to cause such edges to register with each other and simultaneously feed the fly-leaf and signature along the said supports, means to apply adhesive material along one marginal portion of one of the elements to be united, and means to press the said elements together to effectuate the union.

13. In a machine for attaching fly-leaves and the like to signatures of books and the like, in combination, a support for a fly-leaf, an adjacent support for a signature, feeding means to move the fly-leaf and signature along said supports together, said means acting against corresponding edges of the fly-leaf and signatures to cause such edges to register with each other, means to apply paste to a marginal portion of one of the elements to be united, a registering device for another edge of said parts, and a pressing device.

14. In a machine for attaching fly-leaves and the like to signatures of books and the like, in combination, a way for one of the elements to be united, an adjacent way for the other of such elements, said ways having longitudinal openings, a feeding device having portions which project through the openings of both ways and by engagement with corresponding edges of the respective elements cause such edges to register with each other, as well as feed the elements together, a paster, and a pressing device.

15. In a machine for attaching fly-leaves and the like to signatures of books and the like, in combination, a way for one of the elements to be united, an adjacent way for the other of such elements, said ways having longitudinal openings, a feeding device having portions which work through the said openings, a paster, a pressing device, and means for discharging the united signature and fly-leaf.

16. In a machine for attaching fly-leaves and the like to signatures of books and the like, in combination, adjacent signature and fly-leaf ways, a feeding-device engaging with corresponding edges of a signature and fly-leaf and operating to cause such edges to register, a paster, a registering device at one side of the line of feed acting to cause other corresponding edges to register, and a pressing device.

17. In a machine for attaching fly-leaves and the like to signatures of books and the like, in combination, adjacent ways for a signature and a fly-leaf, a feeding-device engaging with corresponding edges of a signature and fly-leaf and operating to cause such edges to register with each other, a paster, a registering device acting on another edge of one element to place a margin in proper position to be acted upon by the paster, a pressing device, and a second registering device to cause the pasted margin and the margin which is to be united thereto to register prior to the pressing operation.

18. In a machine for attaching fly-leaves and the like to signatures of books and the like, in combination, adjacent ways for a signature and a fly-leaf, a feeding device engaging with corresponding edges of a signature and fly-leaf and causing such edges to register with each other, such feeding device also discharging the united signature and fly-leaf, a paster, and a pressing device.

19. In a machine for attaching fly-leaves and the like to signatures of books and the like, in combination, adjacent ways for a signature and a fly-leaf, a paster, a pressing device, a device for feeding the signature and fly-leaf to the action of the paster and pressing device, and means for delivering the united signature and fly-leaf.

20. In a machine for uniting fly-leaves and the like to the signatures of books and the like, in combination, adjacent ways for a signature and a fly-leaf respectively, a device to feed said signature and fly-leaf along the said ways, a paster, a press-roll in connection with the paster, means to move the press-roll toward the paster while an element which is to receive paste is in contact with the paster and move the same away after such contact has been terminated by the passage of the said element, and a pressing device.

21. In a machine for uniting fly-leaves and the like to the signatures of books and the like, in combination, adjacent ways for a fly-leaf and a signature, respectively, a device to feed the said signature and fly-leaf along the said ways, a paster, a press-roll, a cam in operative control of said press-roll and acting to cause the latter to be moved toward the paster while the signature is between press-roll and paster and separated therefrom after the signature has passed, and a pressing device.

22. In a machine for uniting fly-leaves and the like to the signatures of books and the like, in combination, adjacent ways for a fly-leaf and a signature, respectively, means to feed the said signature and fly-leaf along the said ways, a paster, a press-roll, an adjustable cam in operative control of said press-roll and acting to cause the latter to be moved toward the paster while the signature is between press-roll and paster and moved away after the signature has passed, the adjustability of the cam enabling the movements of the press-roll to be varied to suit the length of the signature, and a pressing device.

23. In combination, the rocker provided with laterally-extending guide-arms, the blocks mounted upon said guide-arms, the separators carried by said blocks, the bell-cranks connected with the said blocks, and actuating means for said bell-cranks operating therethrough to occasion the horizontal and vertical movements of the separators.

24. In combination, the swinging nipper-carrying arm, the nipper-carrying block movable radially along said arm, the ring and link-connection constituting an operating toggle for the said block, and the tappet ring whereby the said toggle-ring is actuated.

25. In combination, the main pressers, actuating means therefor, the secondary pressers alongside said main pressers, and means for actuating said secondary pressers to close earlier than the main pressers upon the work, and open later than the main pressers, thereby keeping hold of the work until the latter has been released by the opening of the main pressers.

26. In combination, feed-rolls for delivering a fly-leaf, the feed-chains having projections, ways for a fly-leaf and a signature, respectively, a paster, a pressing device, a feeding-disk in conjunction with the leading end of said feed-chains, a vibrating guide, and a roll moving in unison with said guide and coöperating with the said feeding disk.

In testimony whereof I affix my signature in presence of two witnesses.

WILLARD I. LEWIS.

Witnesses:
 CHAS. F. RANDALL,
 EDITH J. ANDERSON.

Copies of this patent may be obtained for five cents each, by addressing the "Commissioner of Patents, Washington, D. C."

Correction in Letters Patent No. 1,127,034.

It is hereby certified that in Letters Patent No. 1,127,034, granted February 2, 1915, upon the application of Willard I. Lewis, of Walpole, Massachusetts, for an improvement in "Machines for Applying Fly-Leaves and the Like to the Signatures of Books," an error appears in the printed specification requiring correction as follows: Page 12, line 35, for the word "signatures" read *signature;* and that the said Letters Patent should be read with this correction therein that the same may conform to the record of the case in the Patent Office.

Signed and sealed this 16th day of February, A. D., 1915.

[SEAL.]

J. T. NEWTON,

*Acting Commissioner of Patents.*